United States Patent [19]

Maggio

[11] Patent Number: 4,909,268
[45] Date of Patent: Mar. 20, 1990

[54] COLLAPSIBLE ROOM STRUCTURE

[76] Inventor: John J. Maggio, 768 Nevin Way, Apt. 3, San Jose, Calif. 95128

[21] Appl. No.: 270,970

[22] Filed: Nov. 14, 1988

[51] Int. Cl.$^4$ ............................................. E04H 15/06
[52] U.S. Cl. ...................................... 135/88; 135/902
[58] Field of Search ............... 135/88, 901, 902; 43/1; 215/1 C

[56] References Cited

U.S. PATENT DOCUMENTS

| | | | |
|---|---|---|---|
| 2,780,378 | 2/1957 | Romano | 215/1 C |
| 3,474,844 | 10/1969 | Lindstrom | 215/1 C |
| 3,513,605 | 5/1970 | Smith | 43/1 |
| 4,123,869 | 11/1978 | Witt | 43/1 |
| 4,224,754 | 9/1980 | Derryberry | 135/901 |
| 4,492,313 | 1/1985 | Tuzani | 215/1 C |
| 4,682,436 | 7/1987 | Ritson | 135/901 |
| 4,761,908 | 8/1988 | Hayes | 43/1 |
| 4,825,578 | 5/1989 | Robinson | 135/901 |
| 4,833,813 | 5/1989 | McLemore | 135/901 |

Primary Examiner—Henry E. Raduazo

[57] ABSTRACT

A multi-purpose shelter adapted for use as a toilet, shower or changing enclosure of such size as to accommodate a person, has in a preferred embodiment a floor with ventilation and drainage slots surrounded by a cylindrical wall of bellows like configuration. The bellows side wall is integral with the floor and top ring, is freestanding in an extended position and collapsible into a low profile form for quick and easy transportation, storage or shipment.

The fabrication elements used for the manufacture of this invention may be of plastic, rubber or other pliable matter. While polyethylene is the preferred material through a blow mold or rotational mold process, a wide variety of other materials capable of being formed into films or sheets can be satisfactorily employed. The primary requirement is that the bellows like wall provide the flexibility and durability necessary to withstand wind, sun, salt water and other elements without damage, warpage, erosion or distortion.

2 Claims, 3 Drawing Sheets

COLLAPSIBLE ROOM STRUCTURE

BACKGROUND OF THE INVENTION:

The field of this invention pertains generally to portable enclosures such as shower stalls, changing chambers and, in particular, portable toilet shelters. The invention is concerned with such a portable enclosure as useful at places where conventional structures are impractical due to their cumbersome size, weight and generally large number of components required to support a framework, making them unsuitable aboard ski boats, campers and siminlar small recreational vehicles, campsites, beaches and parks.

Examples of present portable toilet and shower structures are disclosed in U.S. Pat. No. 4,493,118 Braxton, 4,305,164 Sargent, 4,726,155 Nahmias, 4,640,061 Trumley, 4,539,721 Moore, 4,163,294 Patterson, 4,065,885 Blick, 4,035,964 Robinson, 3,526,066 Hagar, 3,940,806 Mustee, 1,917,629 Anderson.

Other examples of portable shelters fall into the classification of hunting blinds, including U.S. Pat. Nos. 3,513,605 Smith, 4,123,869 Witt, 4,224,754 Derryberry, 4,682,436 Ritson, 4,825,578 Robinson, 4,761,908 Hayes, 4,833,813 McLemore.

Articles of bellows like side wall configurations are described in U.S. Pat. Nos. 4,492,313 Touzani, 2,780,378 Romano, 3,474,844 Lindstrom, 4,044,836 Martin, 3,956,778 Tanaka, 4,773,458 Touzani, 4,775,564 Shriver, 992,009 Miller, 264,553 Schaufelberger.

No previous privacy shelter was as portable, versatile and convenient in use, particularly on watercraft or land vehicles, as is the present invention described below.

SUMMARY OF THE INVENTION:

The present invention comprises a novel feature in the field of portable toilet and shower shelters in providing a collapsible, freestanding, lightweight and hand-carried enclosure. The purpose of a portable collapsible enclosure is to provide privacy and to eliminate the inconvenience of having a fixed, bulky enclosure where space is essential, unavailable or impractical for common portable toilet stalls due to their large size and number of structural components necessary to support the framework. These conventional toilet stalls often require tools, hardware and special instruction to erect and disassemble.

The present invention provides an article of simplicity, comprising one part which is capable of manufacture on the current market with current means and materials.

This invention is designed to serve particularly on board small boats and at recreational areas as a simple, inexpensive, lightweight, portable, attractive, durable, freestanding, collapsible shelter. The shelter is comprised of a bellows like side wall which may be quickly erected on site for use, having a large inside volume capacity when extended, and is easily collapsed into a compact form for carrying, storage, transportation and shipping.

The fabrication elements used for the manufacture of this invention may be of plastic or other suitable pliable material through a blow mold process. The primary requirement is that the wall provide the flexibility and durability necessary to serve the purpose of the invention.

DESCRIPTION OF THE INVENTION

Figure 1:
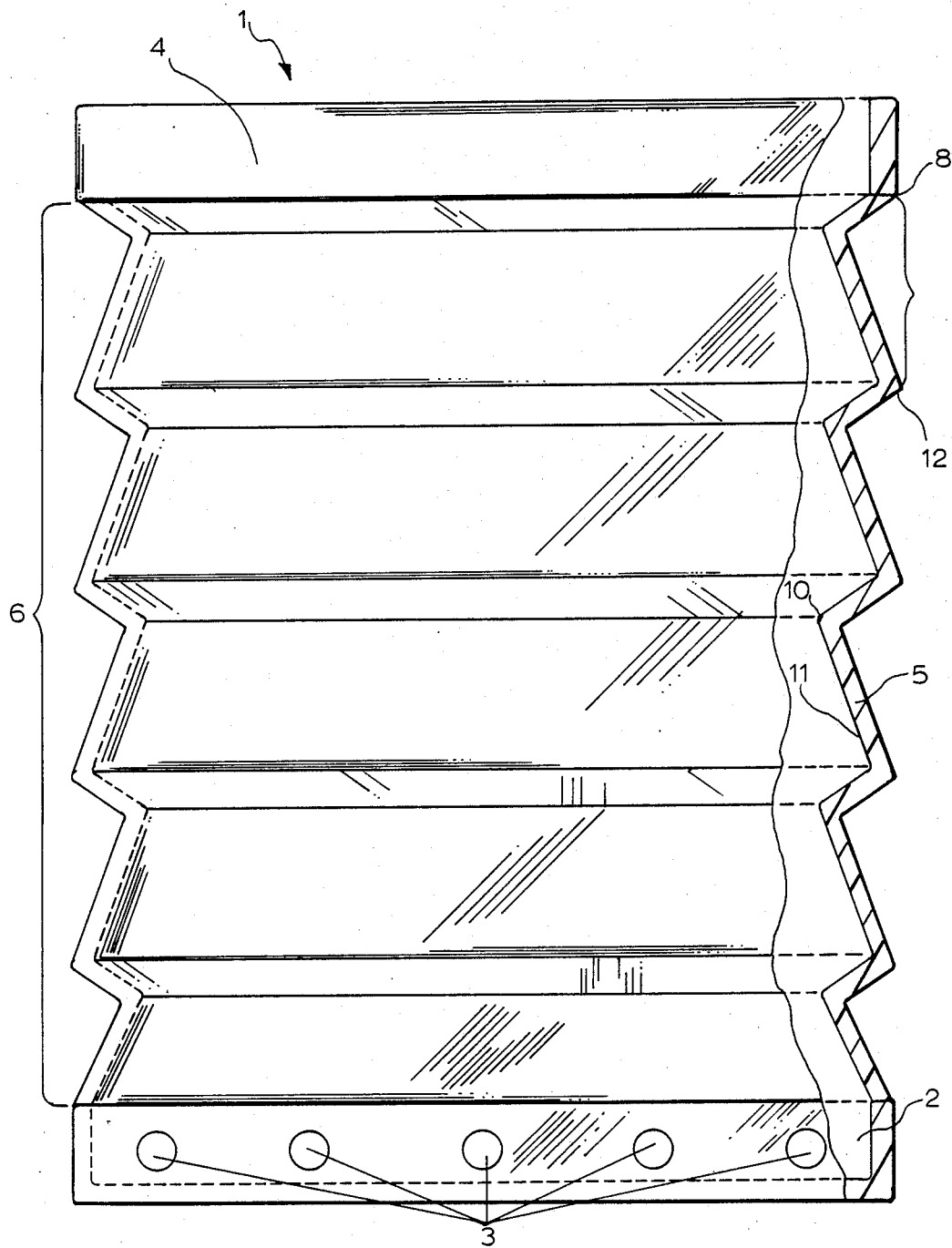
FIG. 1: Perspective is front and center of the invention in an extended position.

FIG. 1: The invention is generally pictured at 1, showing a one-piece, cylinder shaped object with accordion-like side walls 6, here exhibited in an extended position. Base 2 thickness is greater than wall 5 thickness. Drainage (or vent) holes 3 are at spaced distances around the base 2. The top rim 4 is of the same thickness as that of the base 2. Sidewalls 6 comprise nearly all of the physical structure. From the top ring 4 the frame structure 6 zig-zags uniformly down to the base 2. The drawing here shows five rib sections 6 for convenience of illustration; however, to create a wall over six feet, practicality requires many more rib sections than are shown here. Each rib 7 operates separately and independently of the others 6. The first rib begins at the base of the lift ring 8 and extends at a down and inward angle 9 to a fold 10. After the fold 10, the same rib section continues to extend down and outward 11 to the next fold 12. The entire wall is comprised of a series of overlapping folds 6 aligned and parallel between the top lift ring 4 and the base 2. Each consecutive fold is at a different angle to the center 9 and 11. Each rib extending down and outward from the center 11 is approximately twice the length of the rib sections extending down and inward 9. The drawing proportions are exaggerated for purposes of description. The frame housing 6 expands and contracts vertically.

Figure 2:
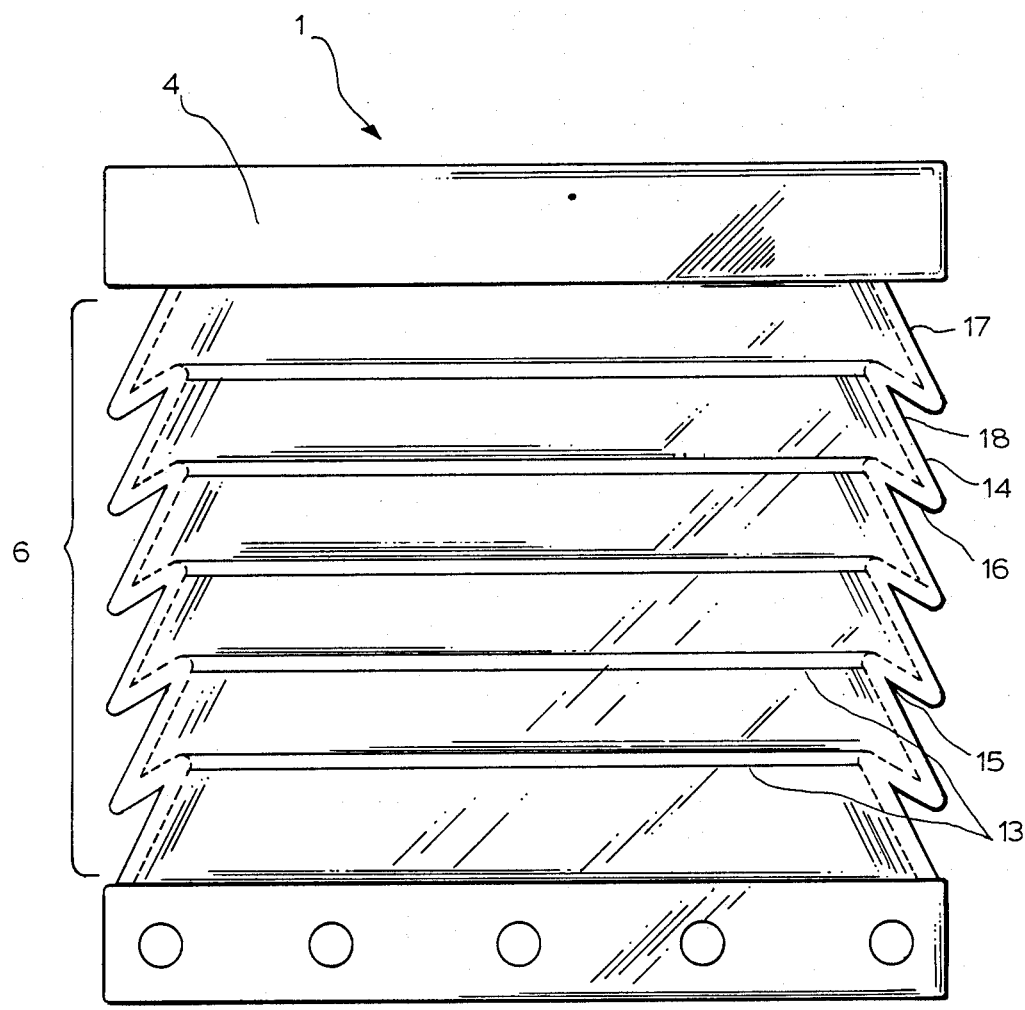
FIG. 2: Perspective is front an center of the invention in a collapsed position.

FIG. 2: The invention is displayed in a collapsed position. Though drawings here are exaggerated, actual ratio of compact size to fully extended (FIG. 1) is approximately six-to-one (6/1). Thus, a unit extended to six feet can be depressed to a height of about one foot). The method of expansion and compression begins when the plastic synthetic materials are molded. The seams at the point of all rib sections 13 are formed at the time of manufacture to create a permanent and flexible hinge-like fold (13) which allows movement of rib sections 17 to be folded over rib sections 18, reducing the overall height of the unit by subtraction of the folded rib. This occurs because the section of rib extending down and inward (FIG. 1; item 9), being nearly half the length of the rib section extending down and outward 14 is overlapped by pressure applied to the top ring 4. When the unit is in any extended position and pressure is applied, the longer sections 14 collapse down and over the shorter sections 16. The more pressure that is applied, the more the ribs will collapse. Because the folds 13 are fashioned from a pliable material, the seams stretch 15 as each rib collapses, causing an audible "pop" as each rib seam expands or collapses. From a compact position as shown here, unit may be raised from one foot to about six feet, or any height between, with little effort, and will remain fixed in that position until intentionally changed.

Figure 3:
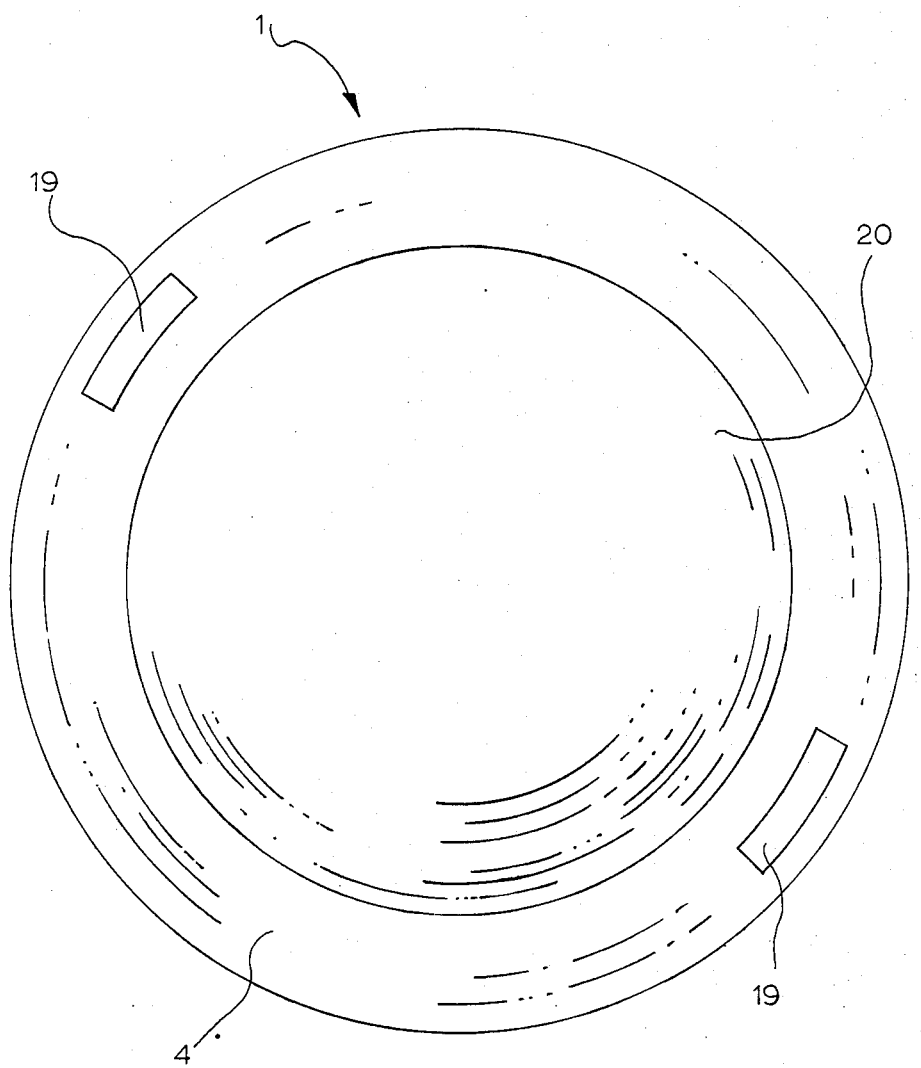
FIG. 3: Perspective of the invention from top dead center.

FIG. 3: The primary shelter of the invention (1) is viewed directly from the top. Formed into the lift ring 4 are two notches 19. The body (FIG. 1; item 6) and base perimeter (FIG. 1; item 2) are out of view from this perspective. The floor surface 20 is connected to the base (FIG. 1; item 2).

I claim:

1. A portable, collapsible shelter useful as a toilet, shower, and changing shelter, comprising, a base with a floor, a top ring joined to the base by a substantially cylindrical side wall, with an aperture at the top ring, said side wall formed into a multitude of circular ribs in accordion-like fashion, with the structure of each rib pointing alternately upward and downward and the ribs being joined integrally by circular fold rings of a thickness less than the basic wall thickness of the rib structure, and including locking means providing an over-centering of the ribs during folding or unfolding of the collapsible shelter, thereby latching the shelter in either an extended or a collapsed position, and the substantially cylindrical wall and top ring being of sufficient diameter to receive a person.

2. The portable, collapsible shelter of claim 1, wherein the ribs include alternating long and short sections, as along the length or height of the shelter, and wherein each rib section expands and compresses as the ribs are folded over to provide a "snap" as each section is stretched over the next, when either extending or contracting, providing said locking means.

* * * * *